United States Defensive Publication [19] (H) [11] T989,004

Gorin [43] Dec. 4, 1979

[54] HYDROGEN TRANSFER SOLVENT EXTRACTION OF COAL

[75] Inventor: Everett Gorin, San Rafael, Calif.

[73] Assignee: Continental Oil Company, Stamford, Conn.

[21] Appl. No.: 969,752

[22] Filed: Dec. 14, 1978

[51] Int. Cl.[2] ..... C10G 1/00; C10G 1/06

[52] U.S. Cl. ..... 208/8 LE; 208/10

[57] ABSTRACT

A coal liquefaction process is provided in which a hydrogen donor solvent is used in the liquefaction of the coal. The process is designed to maintain the hydrogen donor solvent in balance by hydrogenation of the spent hydrogen donor solvent and selected precursors of the hydrogen donor solvent which are generated in selected steps of the overall liquefaction process. The principal sources of the desired hydrogenatable precursors are a hydrogenated solids-free and benzene insolubles-free portion of the coal extract, and particularly the coker distillates generated by coking a non-distillable hydrocracked fraction of said hydrogenated solids-free and benzene insolubles-free portion.

1 Claim, 1 Sheet Drawing,

14 Pages Specification

The file of this unexamined application may be inspected and copies thereof may be purchased (849 O.G. 1221, Apr. 9, 1968).

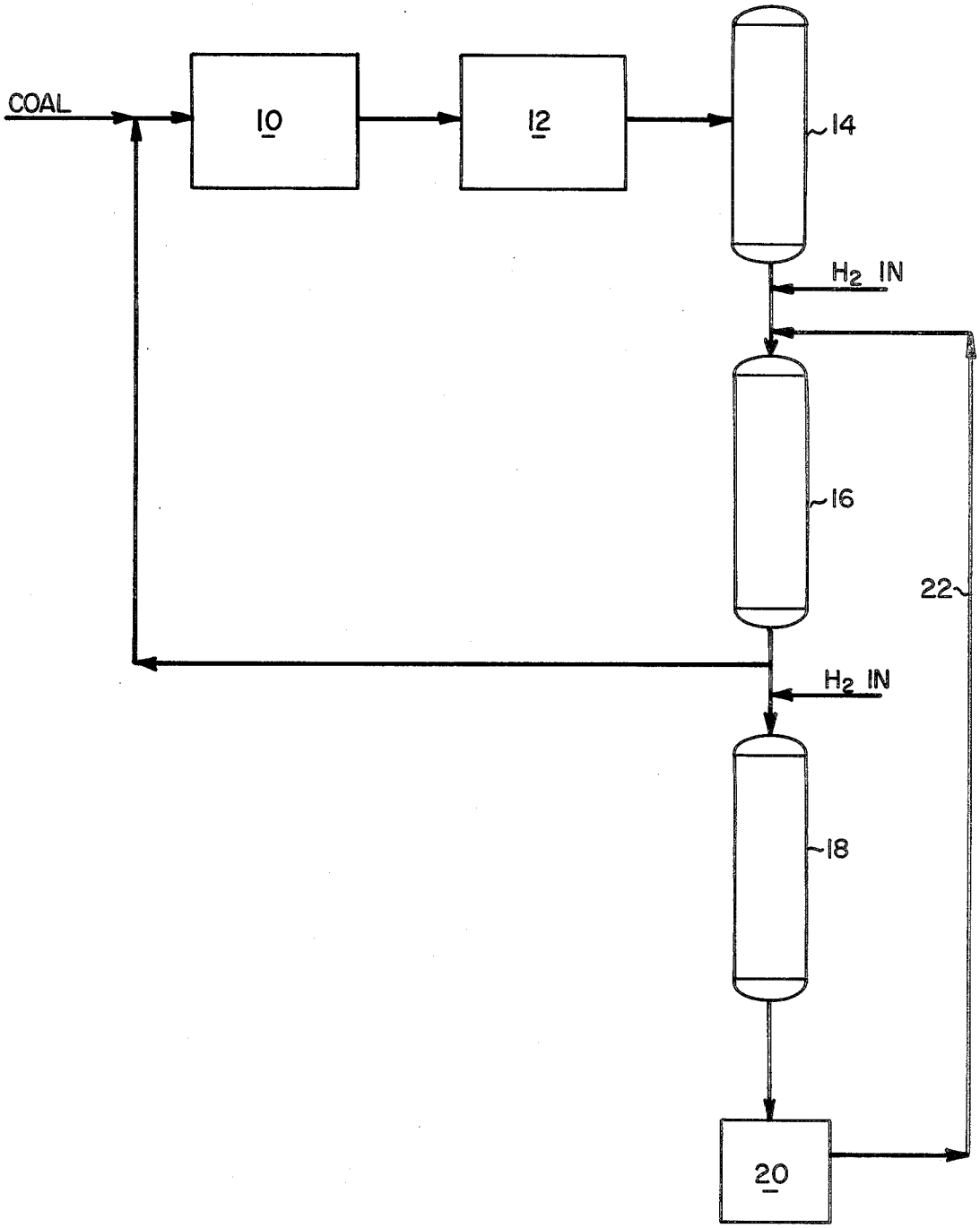
COAL
10
12
14
$H_2$ IN
16
22
$H_2$ IN
18
20